United States Patent
Seid et al.

(10) Patent No.: US 8,557,315 B2
(45) Date of Patent: Oct. 15, 2013

(54) PROCESS OF PREPARATION OF A FOAMED TEA BEVERAGE

(75) Inventors: Eckhard Seid, Estavayer-le-Lac (CH); Jean Pacault, Pontarlier (FR)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 13/395,026

(22) PCT Filed: Sep. 9, 2010

(86) PCT No.: PCT/EP2010/063241
§ 371 (c)(1),
(2), (4) Date: Mar. 8, 2012

(87) PCT Pub. No.: WO2011/029873
PCT Pub. Date: Mar. 17, 2011

(65) Prior Publication Data
US 2012/0177788 A1  Jul. 12, 2012

(30) Foreign Application Priority Data
Sep. 10, 2009 (EP) .................................... 09169923

(51) Int. Cl.
*A23F 3/30* (2006.01)
(52) U.S. Cl.
USPC ........... 426/116; 426/569; 426/548; 426/435; 426/477; 426/394
(58) Field of Classification Search
USPC .................. 426/116, 569, 548, 435, 477, 394
See application file for complete search history.

(56) References Cited

U.S. PATENT DOCUMENTS

| 5,980,969 A | 11/1999 | Mordini et al. |
| 6,048,567 A * | 4/2000 | Villagran et al. ............. 426/594 |
| 6,758,130 B2 * | 7/2004 | Sargent et al. .................. 99/295 |
| 2003/0039731 A1 | 2/2003 | Dalton et al. |

FOREIGN PATENT DOCUMENTS

| CH | 605293 | 9/1978 |
| CN | 101232828 | 7/2008 |
| EP | 242556 | 10/1987 |
| EP | 1243210 | 9/2002 |
| EP | 1247756 | 10/2002 |
| EP | 1500358 | 1/2005 |
| EP | 1532869 | 5/2005 |
| EP | 2475262 | 7/2012 |
| JP | 57071364 | 5/1982 |
| WO | 2005018395 | 3/2005 |
| WO | 2011029873 | 3/2011 |

OTHER PUBLICATIONS

PCT International Search Report for International Application No. PCT/EP2010/063241 with an International Filing Date of Sep. 9, 2010 and a Mailing Date of Oct. 18, 2010.

* cited by examiner

*Primary Examiner* — Anthony Weier
(74) *Attorney, Agent, or Firm* — K&L Gates LLP

(57) ABSTRACT

The invention concerns a foamed tea beverage composed of: a mixture of liquid and bubbles, a foam head above the mixture of liquid and bubbles, characterized in that the beverage is deprived of any creamer, lipid or thickener agent, and in that the said beverage is generated from the combination of water, a powdered tea composition having a tea extract powder, and a food-grade acid.

4 Claims, No Drawings

PROCESS OF PREPARATION OF A FOAMED TEA BEVERAGE

CROSS REFERENCE TO RELATED APPLICATIONS

The present application is a National Stage of International Application No. PCT/EP2010/063241, filed on Sep. 9, 2010, which claims priority to European Patent Application No. 09169923.1, filed on Sep. 10, 2009, the entire contents of which are being incorporated herein by reference.

FIELD OF THE INVENTION

The present invention relates to a new tea flavoured beverage.

BACKGROUND OF THE INVENTION

Classical tea beverages are usually prepared by brewing tea leaves or dissolving tea extract in water. These beverages can slightly froth when initially prepared but at the end of the preparation no bubbles is present. A need exists for more exciting tea-based drink. The foaming of tea beverages could be a manner to develop a tea beverage with a new feeling in particular a creamy mouth feel.

U.S. Pat. No. 5,980,969 has answered this need by providing a tea-based beverage with a head of foam. This foam was obtained by adding a creaming agent like yogurt whey, non-fat dry milk or non-dairy creamers. Consumers like particular creamy mouthfeel, richness, sweetness and flavor impact of creamy products. Yet today, there is an increase demand for light beverages that do not contain any creaming agent whatever their kind.

DETAILED DESCRIPTION OF THE INVENTION

The present invention aims at solving the problem of providing a foamed tea beverage providing the feeling of a creamy mouthfeel but devoid of any creamer, lipid or thickener.

According to a first aspect, the invention concerns a foamed tea beverage composed of:
  a mixture of liquid and bubbles,
  a foam head above the mixture of liquid and bubbles,
wherein the beverage is deprived of any creamer, lipid or thickener agent, and
wherein it is generated from the combination of water and of a powdered tea composition comprising a tea extract powder.

An important volume of the beverage of the present invention is totally foamed: this volume is the foam head that overlays the rest of the beverage that contains a mixture of liquid and bubbles. The difference between these two parts can be easily visually perceived because the foam head is clearer than the rest of the beverage. Usually the part made of foam represents at least 20% vol. of the beverage, preferable at least 25%. This volume is measured about 30 seconds after preparation of the beverage by producing the beverage directly inside a measuring glass and reading the respective volumes of foam and of the whole beverage.

In the beverage of the present invention, the foam is stable which means that the foam head still represents at least 20% vol. of the beverage more than 5 min after the beverage has been dispensed, The foamed tea beverage is also specific in that the foam presents an average bubble size inferior to 100 µm. Preferably at least 50% of the bubbles present a size inferior to 50 µm.

The size of the bubbles is measured just at the end of the preparation of the beverage by taking a part of the foam and transferring it to a transparent beaker, taking a picture of the foam through a microscope (preferably x50 magnification) and analysing the picture by counting the bubbles. This small bubble size brings a sensation of creaminess and thickness.

The foamed tea beverage of the present invention is particular in that it presents a dynamic aspect which means its aspect evolves in the seconds following the time it has been dispensed. First the bubbles present in the mixture of liquid and bubbles very slowly separate from the liquid so that they totally separate from the liquid more than 4 minutes after the beverage has been dispensed. Secondly the bubbles are able to be dispersed again in the liquid by agitating the beverage, for example by a simple agitation with a spoon. Then the foamed tea beverage of the present invention can be drunk by the customer immediately after it has been dispensed or just after redispersion of the bubbles and he has the sensation of drinking a totally foamed beverage, or the beverage can be drunk a few time after it has been dispensed and the sensation is different.

The beverage of the present invention is generated from the combination of water and of a powdered tea composition comprising a tea extract powder. Preferably, the beverage is cold and consequently cold water is mixed with the powdered tea. The foamed tea beverage of the present invention is preferably prepared with a volume of water comprised between 150 and 200 ml so that a sufficient amount of foam is present on the top of the beverage and can be redispersed in the liquid part of the beverage as well as for an aesthetic point of view.

The tea extract powder may the one obtained for example by drying (i.e. spray drying) tea extract although any other form of tea powder can be utilized. The powdered tea composition preferably comprises:
  at least 0.7% weight of tea extract powder, and
  at least 1% weight of a food grad acid, preferably citric acid.
and more preferably:
  between 0.7 and 55% weight of tea extract powder, and
  between 1 and 55% weight of a food grad acid, preferably citric acid.

The powdered tea composition also preferably comprises food additive components able to provide a good taste to the tea extract, in particular at least one of the following powder ingredients: sugar, flavours, artificial sweetener.

The preferred powdered tea composition comprises tea extract powder, citric acid, sugar, flavour, maltodextrin, aspartame, tartaric acid, for example according to the following proportions:
  between 0.7 and 15% weight of tea extract powder,
  between 1 and 15% weight of citric acid,
  between 10 and 95% weight of sugar,
  between 0.1 and 20% weight of maltodextrin,
  between 0.1 and 5% weight of aspartame,
  between 0.1 and 2% weight of tartaric acid,
  flavors.

The beverage of the present invention gives a creamy, rich and bodied mouthfeel although it does not contain any creamer, lipid or thickener agent.

In the present invention, "deprived of any creamer, lipid or thickener agent" means that the beverage does not comprise creamer, lipid or thickener agent in a quantity sufficient to have the said creamer, lipid or thickener agent exert its creamer, lipid or thickener function. Oil or fat may sometimes be present in tea extract powder compositions, for example to answer packaging purposes, but it is used in an amount insufficient to provide a creamer, lipid or thickener function in the final beverage. According to the present invention, the percentage of fat or oil in the beverage is generally inferior to 1% in weight, preferably inferior to 0.5% weight.

A second aspect of the present invention is directed to a capsule that is most preferably a completely closed capsule, for use in a beverage preparation machine. The said machine comprises a receptacle for accommodating said capsule and a fluid injection system for injecting a fluid, preferably water, under pressure into said capsule. Water injected under pressure in the capsule, for the preparation of a foamed tea beverage according to the present invention, is preferably at ambient temperature. However, in some particular instances, it might also be cold, or warm.

According to the invention, the capsule contents comprises a combination of a powdered tea composition comprising a tea extract powder with a food-grade acid, said contents being deprived of any creamer, lipid or thickener agent. The said contents is dissolved and/or extracted inside the capsule chamber by the fluid under pressure, so as to prepare a foamed tea beverage as described above.

The principle of extracting and/or dissolving the contents of the closed capsule consists typically of confining the capsule in a receptacle of a machine, injecting a quantity of pressurized water into the capsule, generally after piercing a face of the capsule with a piercing injection element such as a fluid injection needle mounted on the machine, so as to create a pressurized environment inside the capsule either to extract the substance or dissolve it, and then release the substance extract or the dissolved substance through the capsule.

Machines allowing the application of this principle have already been described for example in patents CH 605 293 and EP 242 556. According to these documents, the machine comprises a receptacle for the capsule and a perforation and injection element made in the form of a hollow needle comprising in its distal region one or more liquid injection orifices. The needle has a dual function in that it opens the top portion of the capsule on the one hand, and that it forms the water inlet channel into the capsule on the other hand.

According to a third aspect, the present invention concerns a process for the preparation of the above described foamed tea beverage by injection of a fluid under pressure into a capsule that contains a beverage-forming substance with the capsule including a chamber containing the substance and a beverage dispensing structure adapted to retain a certain extraction pressure in the chamber before allowing the beverage to flow out of the capsule and wherein the beverage-forming substance is a powdered tea composition comprising:

at least 0.7 weight % of a tea extract powder
at least 1 weight % of food grad acid, preferably citric acid.

The other ingredients mentioned above can also be part of the powdered tea composition extracted in the capsule.

It has been surprisingly observed that the processing of a powdered tea composition comprising tea extract powder and a food grad acid, preferably citric acid, in a capsule presenting a beverage dispensing structure adapted to retain a certain extraction pressure in its chamber before allowing the beverage to flow out of the capsule produces a foamed tea beverage providing the feeling of a creamy mouthfeel although the beverage is devoid of any creamer, lip or thickener.

The beverage dispensing structure can be adapted to retain an extraction pressure in the chamber before allowing the beverage to flow out of the capsule greater than 2 bar, preferably greater than 3 bar.

In the capsule used for extracting the beverage of the present invention, the beverage dispensing structure is preferably provided in the lower portion of the capsule and includes a membrane and a puncturing plate. With such capsules, the dispensing of the beverage is achieved upon perforation of the membrane by contact with the puncturing plate. Actually due to a rise in pressure in the chamber, the membrane is moved to engage the puncturing plate to pierce the membrane and allow the beverage to be dispensed from the capsule. The dispensing of the beverage is achieved after injection of a fluid into the capsule, so that the membrane is perforated by contact with the puncturing plate. The capsules described in WO 2005/018395 are particularly adapted for the preparation of the beverage of the present invention whatever the thickness of the membrane or the sharpness of the puncturing elements.

EXAMPLES

Example 1

According to the Invention

A beverage according to the invention is prepared with a powdered tea composition comprising the following composition in % weight:

| | |
|---|---|
| white semolina sugar | 81.5 |
| tea extract powder | 4 |
| citric acid | 6 |
| maltodextrin DE12 | 3 |
| peach flavors | 4 |
| aspartame | 0.7 |
| tartaric acid | 0.6 |
| peach juice powder | 0.2 |

6 g of the above composition are placed in a plastic capsule which at its bottom has an aluminium foil. When water is delivered by the machine to the capsule, the pressure rises until the aluminium foil is perforated against the bottom opening means, which comprises a plastic plate having several spikes pointing against the aluminium foil such as illustrated in WO 2005/018395. The geometry of the spikes (flat top) and their number, as well as the thickness of the aluminium foil are selected so that the extraction pressure rises to an average of 5 bar before the foil is pierced.

Approximately 174 g of water are allowed to pass through the capsule. Immediately at the end of the preparation, the foamed tea beverage presents two phases:
a mixture of liquid and bubbles,
a foam head above the mixture of liquid and bubbles, said foam representing about 25% of the beverage.

The foam is stable: it still represents 22% vol. of the beverage 5 min after the beverage has been dispensed. After this time, the bubbles can be dispersed again by agitation with a spoon, so that the aspect of the beverage just after preparation can be reached again. If the beverage is not agitated, the bubbles totally separate from the liquid 5 minutes after the beverage has been dispensed.

The size of the bubbles of the foam is around 32.80 μm is the average bubble size measured on 500 bubbles just at the end of the preparation of the beverage.

The beverage tastes as if it comprises cream.

Comparative Example 2

5 g of black tea leaves are placed in the same plastic capsule as used in Example 1 and extracted with the same volume of water. That results in a tea beverage presenting a thin layer of big bubbles that rapidly disappears. Agitation of the beverage with a spoon does not enable the dispersion of the bubbles in the liquid. No creamy taste is obtained.

Comparative Example 3

0.25 g of the tea extract powder used in the composition of example 1 are placed in the same plastic capsule as used in Example 1 and extracted with the same volume of water. This results in a tea beverage presenting a thin layer of big bubbles representing less than 5 vol. % of the beverage above a liquid phase. No dynamic affect of the beverage can be observed: the bubbles do not disperse in the liquid during the preparation of the beverage or after agitation with a spoon. The bubbles are visually quite bigger than the bubbles of the beverage of example 1. The beverage tastes like plain tea.

Comparative Example 4

5.5 g of the tea extract powder used in the composition of example 1 are placed in the same plastic capsule as used in Example 1 and extracted with the same volume of water. The beverage does not present a dynamic effect: bubbles do not stay in the beverage as observed in Example 1 but rise quickly toward the surface. Moreover the part made of foam is inferior to 20% vol. of the beverage. Finally the taste of the beverage is such that the beverage is not drinkable as such.

The invention claimed is:

1. A process for the preparation of a foamed tea beverage, the process comprising:
    injecting a fluid under pressure into a capsule comprising a chamber containing a beverage-forming substance and having a beverage dispensing structure adapted to retain an extraction pressure in the chamber before allowing the beverage to flow out of the capsule at greater than 2 bar,
    wherein the beverage-forming substance is a powdered tea composition comprising at least 0.7 weight % of a tea extract powder and at least 1 weight % of a food grade acid, and wherein the beverage comprises a mixture of liquid and bubbles, a foam head above the mixture of liquid and bubbles, and the beverage does not include any creamer, lipid or thickener agent.

2. The process of claim 1, wherein the beverage dispensing structure is provided in a lower portion of the capsules and includes a membrane and a puncturing plate.

3. The process of claim 2, wherein dispensing of the beverage is achieved by perforation of the membrane with a puncturing plate.

4. The process of claim 3, wherein due to an increase in pressure in the chamber, the membrane is moved to engage the puncturing plate to pierce the membrane and allow the beverage to be dispensed from the capsule.

* * * * *